United States Patent
Park et al.

(10) Patent No.: US 12,177,808 B2
(45) Date of Patent: Dec. 24, 2024

(54) UAS SERVICE CONTROL METHOD AND DEVICE USING WIRELESS COMMUNICATION SYSTEM

(71) Applicant: Samsung Electronics Co., Ltd., Gyeonggi-do (KR)

(72) Inventors: Jungshin Park, Gyeonggi-do (KR); Sangjun Moon, Gyeonggi-do (KR); Sangsoo Jeong, Gyeonggi-do (KR); Yoonseon Han, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 288 days.

(21) Appl. No.: 17/639,048

(22) PCT Filed: Aug. 25, 2020

(86) PCT No.: PCT/KR2020/011320
§ 371 (c)(1),
(2) Date: Feb. 28, 2022

(87) PCT Pub. No.: WO2021/040381
PCT Pub. Date: Mar. 4, 2021

(65) Prior Publication Data
US 2022/0330197 A1    Oct. 13, 2022

(30) Foreign Application Priority Data

Aug. 30, 2019  (KR) .................. 10-2019-0107648
Nov. 15, 2019  (KR) .................. 10-2019-0146956

(51) Int. Cl.
*H04W 4/40*     (2018.01)
*H04W 8/08*     (2009.01)
(Continued)

(52) U.S. Cl.
CPC ............. *H04W 64/00* (2013.01); *H04W 4/40* (2018.02); *H04W 8/08* (2013.01); *H04W 24/10* (2013.01); *H04W 60/00* (2013.01)

(58) Field of Classification Search
CPC ....... H04W 4/40; H04W 64/00; H04W 60/00; H04W 12/08; H04W 12/64; H04W 24/10;
(Continued)

(56) References Cited

U.S. PATENT DOCUMENTS 9,862,488 B2    1/2018  Hunt et al.
10,048,684 B2   8/2018  Dowlatkhah et al.
(Continued)

FOREIGN PATENT DOCUMENTS

KR    1020180120369    11/2018
KR    1020190100089    8/2019
(Continued)

OTHER PUBLICATIONS

European Search Report dated Aug. 10, 2022 issued in counterpart application No. 20856038.3-1218, 10 pages.
(Continued)

*Primary Examiner* — Hirdepal Singh
(74) *Attorney, Agent, or Firm* — The Farrell Law Firm, P.C.

(57) ABSTRACT

Provided is a method of providing an unmanned aerial system (UAS), the method including: performing an authorization procedure with respect to an unmanned aerial vehicle (UAV) and a UAV controller (UAC); after the authorization procedure is completed, receiving UAS serviceable area information from an unified data management (UDM) or a policy control function (PCF); and providing the received UAS serviceable area information to the UAV and the UAC via a base station.

15 Claims, 13 Drawing Sheets

(51) Int. Cl.
*H04W 24/10* (2009.01)
*H04W 60/00* (2009.01)
*H04W 64/00* (2009.01)

(58) Field of Classification Search
CPC ... H04W 28/0226; H04W 4/02; H04W 4/021; H04W 4/24; H04W 68/00; H04W 8/08; H04W 84/06; H04W 88/14; H04W 76/10; H04W 8/16; H04W 80/10; G08G 5/0013; G08G 5/0026; G08G 5/0043; G08G 5/006; G08G 5/0069; H04L 12/1407; H04M 15/66
USPC ..................................................... 455/435.1
See application file for complete search history.

(56) References Cited

U.S. PATENT DOCUMENTS

| | | | |
|---|---|---|---|
| 11,445,510 B2* | 9/2022 | Takács | H04W 28/26 |
| 2020/0250993 A1* | 8/2020 | Li | G08G 5/0021 |
| 2021/0065566 A1 | 3/2021 | Li et al. | |
| 2021/0329460 A1* | 10/2021 | Liao | H04W 12/37 |
| 2021/0405655 A1* | 12/2021 | Yi | G05D 1/0669 |
| 2022/0187851 A1* | 6/2022 | Poscher | G08G 5/0082 |

FOREIGN PATENT DOCUMENTS

| | | |
|---|---|---|
| WO | WO 2018/178752 | 10/2018 |
| WO | WO 2019/148188 | 8/2019 |

OTHER PUBLICATIONS

3GPP, 3rd Generation Partnership Project; Technicial Specification Group Services and System Aspects; Remote Identification of Unmanned.
Aerial Systems; Stage 1 (Release 16), 3GPP TR 22.825 V16.0.0, Sep. 2018, 22 pages.
International Search Report dated Nov. 25, 2020 issued in counterpart application No. PCT/KR2020/011320, 8 pages.
European Search Report dated Jan. 25, 2024 issued in counterpart application No. 20856038.3-1218, 7 pages.
European Communication Report dated Jul. 4, 2024 issued in counterpart application No. 20856038.3-1218, 7 pages.

* cited by examiner

UAS SERVICE CONTROL METHOD AND DEVICE USING WIRELESS COMMUNICATION SYSTEM

PRIORITY

This application is a National Phase Entry of PCT International Application No. PCT/KR2020/011320, which was filed on Aug. 25, 2020, and claims priority to Korean Patent Application Nos. 10-2019-0107648 and 10-2019-0146956, which were filed on Aug. 30, 2019 and Nov. 15, 2019, respectively, the entire content of each of which is incorporated herein by reference.

TECHNICAL FIELD

The disclosure relates to a method and apparatus for controlling a service of an unmanned aerial system (UAS) terminal by using a wireless communication system.

BACKGROUND ART

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz. In order to reduce the path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of Cloud-RAN as the big data processing technology described above may be an example of convergence of 5G communication technology and IoT technology.

As various services can be provided according to the development of the wireless communication system as described above, the need for a method of providing a UAS service through the wireless communication system has emerged.

DESCRIPTION OF EMBODIMENTS

Technical Problem

The disclosure provides an unmanned aerial system (UAS) service by using a wireless communication system.

Solution to Problem

The disclosure provides a method of controlling a service of an unmanned aerial system (UAS) terminal by using a wireless communication system.

Advantageous Effects of Disclosure

According to the disclosed embodiments, an apparatus and method for effectively providing an UAS service are provided.

BEST MODE

Figure 1:
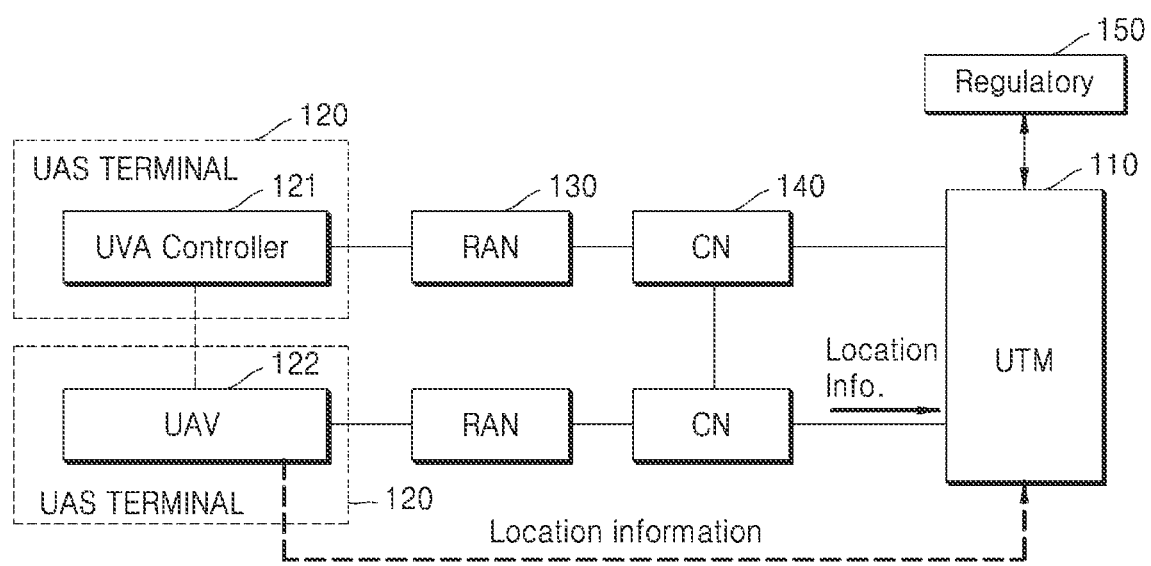
FIG. 1 illustrates an overall configuration an UAS according to an embodiment of the disclosure.

According to an embodiment of the disclosure, a method of providing a Unmanned Aerial System (UAS) may include: performing an authorization procedure with an Unmanned Aerial Vehicle (UAV) and a UAC; after the authorization procedure is completed, receiving UAS serviceable area information from a Unified Data Management (UDM) or a Policy Control Function (PCF); and providing the received UAS serviceable area information to the UAV and the UAC via a base station.

The UAS serviceable area information may be determined based on a no flight zone determined by an Unmanned Traffic Management (UTM).

The providing of the received UAS serviceable area information to the UAV and the UAC via a base station may include providing the received UAS serviceable area information via a registration approval message.

The receiving of the UAS serviceable area information from the UDM or the PCF may include receiving the UAS serviceable area information via a response message to a registration request message transmitted to the UDM or the PCF.

The UAS serviceable area information may include at least one of a tracking area identifier (TAI) or a cell identifier (ID).

The method may further include: receiving, from the base station, notification information notifying that a connection with the UAV is disconnected or the UAV may enter the no flight zone; and transmitting the received notification information to the PCF.

Control of the UAV may be performed by a UAS that has received the notification information.

The notification information may include at least one of identification information, cell ID information, geographical location information, or administrative location information of the UAV.

The control of the UAV may be performed by a UAS control message including at least one of direction information, authentication code information, or control code information.

According to an embodiment of the disclosure, a method of providing a Unmanned Aerial System (UAS) service of a Unmanned Aerial Vehicle (UAV) may include: transmitting, to an AMF, a registration request message through a base station; performing an authorization procedure with respect to a network entity in a core network, based on the registration request message; and after the authorization procedure is completed, receiving UAS serviceable area information from the base station.

The UAS serviceable area information may be determined based on a no flight zone determined by an Unmanned Traffic Management (UTM).

The receiving of the UAS serviceable area information from the base station may include receiving the UAS serviceable area information through a registration approval message.

The UAS serviceable area information may include at least one of a tracking area identifier (TAI) or a cell identifier (ID).

The method may further include: transmitting a measurement report to the base station; and receiving a UAS control message from the UTM.

The UAS control message may be generated based on notification information notifying that a connection with the UAV is disconnected or the UAV may enter the no flight zone, wherein the notification information is transmitted by the base station to the PCF based on the measurement report.

The notification information may include at least one of identification information, cell ID information, geographical location information, or administrative location information of the UAV.

The UAS control message may include at least one of direction information, authentication code information, or control code information.

According to an embodiment of the disclosure, an Access and mobility management Function (AMF) providing a Unmanned Aerial System (UAS) service, may include: a transceiver; and a processor that is coupled to the transceiver and configured to perform an authorization procedure with a Unmanned Aerial Vehicle (UAV) and a UAC, receive, after the authorization procedure is completed. UAS serviceable information from a Unified Data Management (UDM) or a Policy Control Function (PCF), and provide, to the UAV and the UAC, the received serviceable information, through a base station.

The UAS serviceable area information may be determined based on a no flight zone determined by an Unmanned Traffic Management (UTM).

The processor may be further configured to provide the received UAS serviceable area information via a registration approval message, and receive the UAS serviceable area information via a response message to a registration request message transmitted to the UDM or the PCF.

The UAS serviceable area information may include at least one of a tracking area identifier (TAI) or a cell identifier (ID).

The processor may be further configured to receive, from the base station, notification information notifying that a connection with the UAV is disconnected or that the UAV may enter the no flight zone; and transmit the received notification information to the PCF.

The UAV may be controlled by a UAS that has received the notification information.

The notification information may include at least one of identification information, cell ID information, geographical location information, or administrative location information of the UAV.

The control of the UAV may be performed by a UAS control message including at least one of direction information, authentication code information, or control code information.

According to an embodiment of the disclosure, a Unmanned Aerial Vehicle (UAV) for providing a Unmanned Aerial System (UAS) service, may include: a transceiver; and a processor coupled to the transceiver and configured to transmit to an AMF a registration request message through a base station; perform an authorization procedure with respect to a network entity in a core network based on the registration request message; and after the authorization procedure is completed, receive UAS serviceable area information from the base station.

The UAS serviceable area information may be determined based on a no flight zone determined by an Unmanned Traffic Management (UTM).

The processor may be further configured to receive the UAS serviceable area information via a registration approval message, and the UAS serviceable area information may include at least one of a tracking area identifier (TAI) or a cell identifier (ID).

The processor may be further configured to transmit a measurement report to the base station and receive a UAS control message from the UTM.

The UAS control message may be generated based on notification information notifying that a connection with the UAV is disconnected or the UAV may enter the no flight zone, wherein the notification information is transmitted by the base station to the PCF based on the measurement report.

The notification information may include at least one of identification information, cell ID information, geographical location information, or administrative location information of the UAV, The UAS control message may include at least one of direction information, authentication code information, or control code information.

MODE OF DISCLOSURE

Hereinafter, operation principles of the disclosure will be described with reference to accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

For the same reason, some elements in the drawings are exaggerated, omitted, or schematically illustrated. Also, actual sizes of respective elements are not necessarily represented in the drawings. In the drawings, the same or corresponding elements are denoted by the same reference numerals.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals or characters refer to like elements.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-executable or computer-readable memory that may direct a computer or other programmable data processing equipment to function in a particular manner, such that the instructions stored in the computer-executable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" or " . . . er(or)" used herein denotes a software element or a hardware element such as a field-programmable gate array (FPGA) or an application-specific integrated circuit (AMC), and performs a certain function. However, the term 'unit' or ' . . . er(or)' is not limited to software or hardware. The term 'unit' or ' . . . er(or)' may be configured to be included in an addressable storage medium or to reproduce one or more processors. Thus, the term 'unit' or ' . . . er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or ' . . . ers(ors)' may be combined into a smaller number of components and 'units' or ' . . . ers(ors)' or may be further separated into additional components and 'units' or ' . . . ers(ors)'. In addition, the components and 'units' or ' . . . ers(ors)' may be implemented to operate one or more central processing units (CPUs) in a device or a secure multimedia card. Also, in the embodiments, 'units' or ' . . . ers(ors)' may include at least one processor.

While describing the disclosure, detailed description of related well-known functions or configurations may be omitted when it is deemed that they may unnecessarily obscure the essence of the disclosure. Hereinafter, embodiments of the disclosure will be described with reference to accompanying drawings.

The term for identifying an access node, the term referring to a network entity, the term referring to messages, the term referring to an interface between network entities, the term referring to various identification information, and the like, are exemplified for convenience of description. However, the disclosure is not limited by the following terms, and other terms having equivalent technical meanings may be used.

For convenience of description, in the disclosure, terms and names defined in LTE and NR standards, which are the latest standards defined by the 3rd Generation Partnership Project (3GPP) organization among existing communication standards, are used. However, the disclosure is not limited by the terms and names, and may be equally applied to systems conforming to other standards. In particular, the disclosure can be applied to 3GPP NR (5th generation mobile communication standard). In addition, the embodiments of the disclosure may be applied to other communication systems having a similar technical background or channel type. In addition, the embodiments of the disclosure may be applied to other communication systems through some modifications within a range that does not significantly depart from the scope of the disclosure, as judged by a person skilled in the art.

An object of the disclosure is to define a method and apparatus for a UAS (Unmanned Aerial System) service operator to define a service provision area of a UAS subscriber terminal and control the terminal not to deviate from a service area. An object of the disclosure is to define a method for a UAS operator to receive status information of a UAS terminal from a wireless communication system and manage a service area of the UAS terminal.

According to an embodiment of the disclosure, an UAS terminal may be preemptively controlled through a UAS, based on the communication environment of the UAS terminal and determination of a movement path of the UAS terminal, before the terminal moves to a service restricted zone.

Also, an object of the disclosure is to define a method and apparatus for an Unmanned Aerial System (UAS) service operator to define a service provision area of a UAS subscriber terminal and control the terminal when the terminal has deviated from a service area.

According to an embodiment of the disclosure, a UTM may determine a location of a UAS terminal by utilizing a wireless communication system, and may perform required control on the UAS terminal that has moved to an area where a UAS service is not allowed, by utilizing a wireless communication system.

FIG. 1 is a diagram illustrating a system structure for providing a UAS service, according to an embodiment of the disclosure.

An UAS for providing a UAS service may include at least one of a Unmanned Aerial Vehicle (UAV) and a UAV controller, which are elements constituting a Unmanned Aerial System (UAS), a Radio Access Network (RAN) and a Core Network (CN) of a wireless communication system (or mobile communication system), a UAS Traffic Management (UTM) for providing additional information to a UAS terminal and controlling operation, and a Regulatory providing flight regulation information, such as the government. The UAS is not limited to the above example, and the system for providing a UAS service may include more or fewer components than those illustrated in FIG. 1, and an operation or function of at least one component may be provided by a different component.

According to an embodiment of the disclosure, a UAV 122 may include various flying devices such as a flight vehicle, a vehicle, and an aircraft capable of providing a UAS service. For example, a UAV may include an airplane, a helicopter, a drone, a robot, etc., and is not limited to the above examples, and may include a flying device capable of providing a service in an operable area regardless of the form or structure thereof.

According to an embodiment of the disclosure, a UAV controller 121 may control at least one UAV. For example, the UAV controller may control the location, flight, route, speed, etc. of a UAV. The UAV controller is not limited to the above example.

According to an embodiment of the disclosure, a Radio Access Network (RAN) 130 and a Core Network (CN) 140 may refer to configurations included in a wireless communication network, respectively. The RAN 130 may be a configuration in charge of wireless connection to a wireless terminal (e.g., UAV). For example, the RAN 130 may be a base station. The base station may include an LTE base station (e.g., eNodeB) or an NR base station (gNodeB).

In addition, the Core Network (CN) 140 may include network elements that process data received from a wireless terminal through a RAN and provide connection with other networks, and may include a 5G core network, Evolved Packet System (EPS), etc.

According to an embodiment of the disclosure, a wireless communication system (or a wireless communication network) may refer to a mobile communication system (or a mobile communication network). Also, the wireless communication system may include a RAN and a CN.

According to an embodiment of the disclosure, components included in the UAS service system of FIG. 1 may be network functions. Also, the network function may be referred to as a network entity. The components are not limited to the above example, and may be separate configurations other than a network function.

Referring to FIG. 1, a UTM 110 may be a configuration for tracking and managing the registration and movement of the UAS terminal 120, that is, of each of the UAV 121 and the UAV controller 122. The UTM 110 may collect information about a change in a location of a UAS terminal from the UAS terminal and the wireless communication network (e.g., the RAN 130, the CN 140) periodically or when a certain condition is satisfied, and may perform operations needed to control the UAV 122, for example, may order a terminal to stop flight when the terminal has left a permitted flight zone or to return to a permitted area, in consideration of flight control information specified by the Regulatory 150.

In addition, according to an embodiment of the disclosure, the UTM 110 may deliver information related to a no flight zone of the UAS terminal 120 to the UAS terminal 120 and the wireless communication system (e.g., RAN or CN) in advance or during a service through a registration process of a terminal or a separate message. In a method of limiting the service area of the terminal based on information about no flight zones, prior control through the UTM 110 may be restricted until the UAS terminal 120 moves to the no flight zone.

Figure 2:
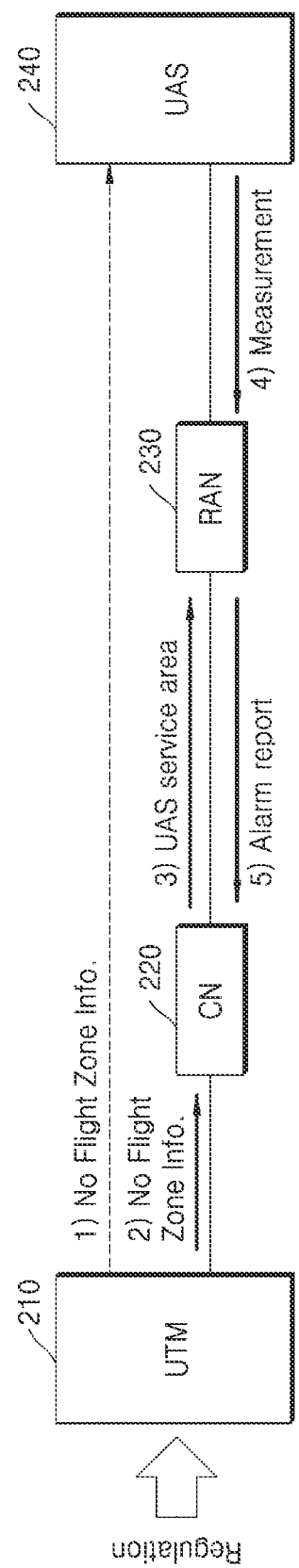
FIG. 2 is a diagram for describing a method of providing a UAS service, according to an embodiment of the disclosure.

FIG. 2 illustrates a method of providing an UAS service, according to an embodiment of the disclosure.

According to an embodiment of the disclosure, a method of enabling control through a UTM 210 before a UAS terminal 240 moves to a no flight zone in a state where the UAS terminal 240 is controllable, by using a wireless communication system, is provided.

According to an embodiment of the disclosure, the UTM 210 may provide information about no flight zones (No Flight Zone Info) to the UAS terminal 240. For example, the UTM 210 may provide information about no flight zones to the UAS terminal 240 through a wireless communication network (a CN 220 and a RAN 230) (operation 2), or may provide information about no flight zones by using a different method (e.g., UAS applications) (operation 1). However, according to implementations, operation 1 of providing information about no flight zones by using a different method may be omitted.

According to an embodiment of the disclosure, the UTM 210 may deliver information about no flight zones of the UAS terminal 240 to the CN 220 of the wireless communication system (operation 2). The CN 220 may configure UAS service restricted area information in the wireless communication system (e.g., information about a UAS service area) based on the information about no flight zones, received from the UTM 210, and deliver the information to the RAN 230 (operation 3).

According to an embodiment of the disclosure, the UAS service restricted area information may be a TAI (Tracking Area Identifier) or a cell ID. The UAS service restricted area information is not limited to the above example, and the UAS service restricted area information may include any type of information that can identify a UAS service restricted area.

That is, the CN 220 may identify which cell or which tracking area a no flight zone corresponds to, generate (or configure) UAS service restricted area information which is the identified information, and provide the UAS service restricted area information to the RAN 230.

According to an embodiment of the disclosure, in a process of determining whether handover occurs, based on channel quality information included in a Measurement Report received from the terminal (operation 4: Measurement), the RAN 230 may perform an operation of selecting a target cell for handover, in consideration of a current cell ID, GPS location information, UAS service restricted area information, and the like of the terminal.

According to an embodiment of the disclosure, when the channel quality information received from the terminal is maintained at or below a reference value and there is no replacement cell within a UAS serviceable area, the RAN 230 may deliver, to the UTM 210 via the CN 220, a warning message indicating that communication with the UAS terminal 240 may be lost, and thus control is required (operation 5: Alarm Report).

According to an embodiment of the disclosure, when receiving the warning message, the UTM 210 may deliver a warning message regarding a UAS service restricted zone, to the UAS terminal 240. In addition, when necessary, the UTM 210 may perform necessary control such as flight control and remote control on the UAS terminal 240 (e.g., UAV), Transmission of a warning message may be initiated by the RAN 230 in consideration of a current movement path and speed of the terminal, according to implementations.

Figure 3:
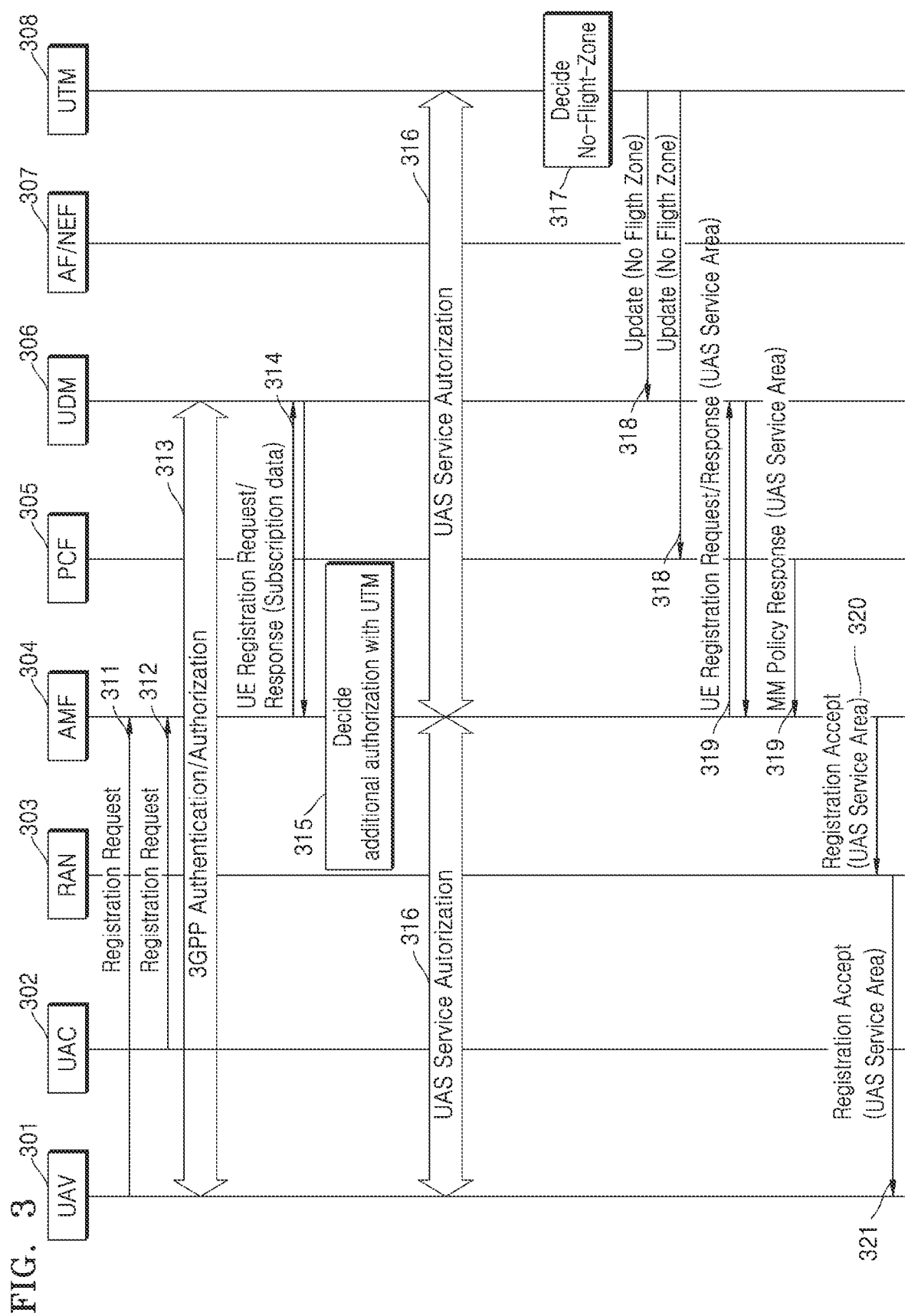
FIG. 3 illustrates a process of registering a UAS terminal with a UAS traffic management (UTM) to use a UAS service, according to an embodiment of the disclosure.

FIG. 3 illustrates an operation of delivering information about no flight zones, to a terminal and a wireless communication system in an initial access process of a UAS terminal, according to an embodiment of the disclosure. The operation of delivering the information about the no flight zone of FIG. 3 is an example of the disclosure, and names of messages, transmission order of the messages, or the like may be changed according to implementations.

According to an embodiment of the disclosure, a UAV 301 and a UAV controller (UAC) terminal 302 may perform an initial registration process for a communication service through a wireless communication network. Referring to FIG. 3, in operation 311, the UAV 301 may transmit a Registration Request to an AMF 304. In operation 312, the UAC 302 may transmit a Registration Request to the AMF 304, and the UAV 301 and the UAC 302 may perform an initial registration process with network entities in a CN, such as the AMF (Access and mobility Management Function) 304, a Policy Control Function (PCF) 305, a Unified Data Management (UDM) 306, and perform an authorization process (e.g., 3GPP Authentication/Authorization).

When an authorization process of operation 313 is successfully performed, the wireless communication network determines that the terminal is a UAS terminal (the UAV 301 or the UAC 302, based on UE type information transmitted by the terminal via the Registration Request message or UE Type information registered to subscription information of the terminal. Referring to FIG. 3, in operation 314, the AMF 304 may acquire subscription data by exchanging UE Registration Request/Response messages from the UDM, and UE type information may be included in the subscription data.

The wireless communication network may determine that an additional authorization process with a UTM for flight approval and UAS service authorization is to be additionally performed with respect to a UAS Type terminal (e.g., UAV), and control the UAS terminal (e.g., the UAV 301, the UAC 302) to perform a necessary additional authorization process with a UTM 308. Referring to FIG. 3, in operation 315, the AMF 304 may determine whether the UAS Type terminal is to perform an additional authorization process with a UTM (Decide additional authorization with UTM), and control the UAV 301 and the UTM 308 to perform an additional authorization process, based on a determination result.

When the UAS terminal is successfully authorized and a service is made available, the UTM 308 may configure information about no flight zones (or permitted flight zones) of the UAS terminal and deliver the information to the wireless communication system and the terminal. Referring to FIG. 3, in operation 317, the UTM 308 may determine, judge or identify no flight zones based on information received from the Regulatory and configuration information, weather/traffic information, and the like (Decide No Flight Zone). The UTM 308 may deliver the identified information to the wireless communication system. The information about no flight zones may be expressed as, for example, geographic information such as location and longitude, administrative zone information, or location information used in other aviation systems.

Also, the UTM 308 may deliver Information about no flight zones of the terminal to the UDM 306 and the PCF 305. The UTM 308 may deliver the information about no flight zones to the UDM 306 and the PCF 305. Referring to FIG. 3, in operation 318, the UTM 308 may provide information about the no flight zones to the UDM and the PCF through an Update message.

The AMF 304 may configure information about UAS serviceable areas (or UAS service restricted areas) of the terminal, based on the information about no flight zones of the terminal, received from the UDM 306 and the PCF 305 in a process of completing the registration process of the terminal, and deliver the above information to the RAN and the terminal via a registration approval message.

Referring to FIG. 3, in operation 319, the AMF 304 may transmit or receive a UE Registration Request/Response message from the UDM 306 and transmit or receive an MM Policy Request/Response message from the PCF. At least one of the UE Registration Response message and the MM Policy Response message may include UAS serviceable area information.

According to an embodiment of the disclosure, the PCF 305 (or a Network Exposure Function (NEF) 307) may generate (or configure) UAS serviceable area information based on the information about no flight zones, received from the UTM 308. The PCF 305 (or the NEF 307) may transmit the generated UAS serviceable area information to the AMF 304.

Also, according to an embodiment of the disclosure, the UAS serviceable area information may be a tracking area identifier (TAI) or a cell ID. The UAS serviceable area information is not limited to the above example, and the UAS serviceable area information may include any type of information that may be used in a wireless communication network that may identify a UAS service restricted area.

According to an embodiment of the disclosure, the AMF 304 may transmit UAS serviceable area information to the RAN 303. In operation 320, the AMF 304 may transmit serviceable area information to the RAN 303 in a process of delivering a Registration Accept message to the UAV. In addition, in operation 321, the RAN 303 may transmit, to the UAV 301, serviceable area information by delivering the Registration Accept message received from the AMF, to the UAV 301.

Figure 4:
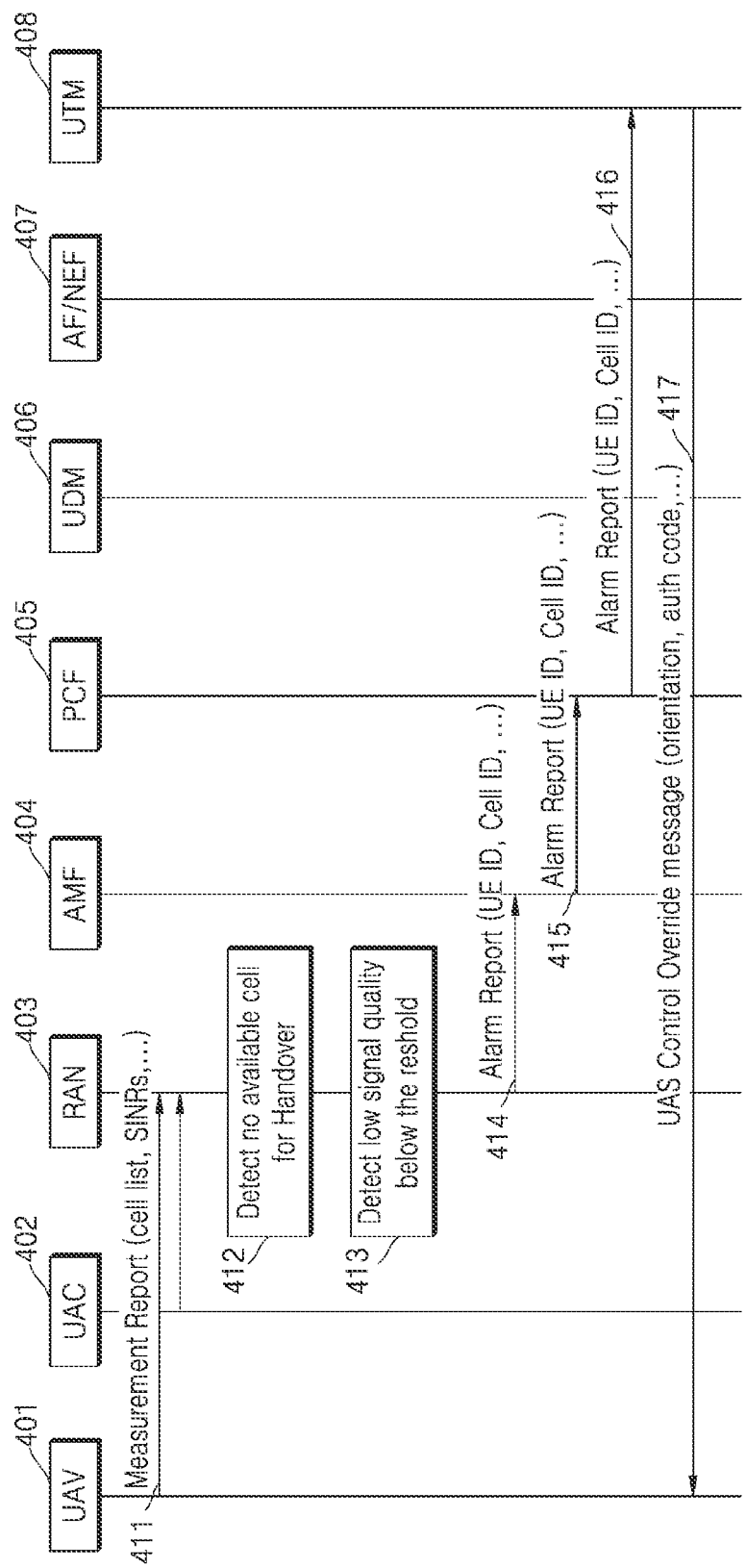
FIG. 4 illustrates a method of controlling a UAS service area, according to the signal quality of a terminal and a change in a location of the terminal, according to an embodiment of the disclosure.

FIG. 4 illustrates a method of controlling an UAS service area, according to the signal quality of a terminal and a change in a location of the terminal, according to an embodiment of the disclosure. The method of controlling a UAS service area according to the signal quality and a change in a location of the terminal of FIG. 4 is an example of the disclosure, and the name of the message, names of messages, transmission order of the messages, or the like may be changed according to implementations.

A UAS terminal may perform an operation of transmitting a measurement value (measurement report) with respect to a reception channel quality to a RAN according to a period and condition set by a wireless communication system. Referring to FIG. 4, in operation 411, a UAS terminal (a UAV 401 or a UAC 402) may transmit a measurement report. The measurement report may include a cell list, an SINR value, and the like. The measurement report is not limited to the above example.

A RAN 403 compares a channel quality measurement value received from a terminal, with a handover reference value, to determine handover to another cell. Referring to FIG. 4, in operation 412, the RAN 403 may determine whether there is an available cell for handover, and in operation 413, the RAN 403 may determine whether the signal quality drops to or below a certain threshold. The disclosure is not limited to the above example.

In a situation where the channel quality continues to fall to or below a set value (e.g., a handover reference value) while the terminal is flying in an adjacent cell (location) of a no flight zone (or in a border cell of the permitted flight area), when there is no replacement cell in the permitted flight area, the RAN may deliver, to an AMF, a warning message including information such as a current location of the terminal and communication status of the terminal in order to warn a UTM that a communication connection for flight control of the terminal may be lost or that the terminal may enter the no flight zone. Referring to FIG. 4, in operation 414, the RAN 403 may transmit an Alarm Report to the AMF, and the Alarm Report may include a UE ID, a Cell ID, and the like. The disclosure is not limited to the above example.

The AMF 404 may deliver, to the PCF, information of the warning message received from the RAN. Referring to FIG. 4, in operation 415, the AMF 404 may transmit an Alarm Report to the PCF 405, and the Alarm Report may include a UE ID, a Cell ID, and the like. The disclosure is not limited to the above example.

The PCF 405 may check the flight policy of the terminal, and when a violation is confirmed (or predicted), the PCF 405 may deliver the current location and warning status of the terminal to a UTM 408 through an NEF and AF 407 to enable the UTM 408 to take necessary actions before a communication with the terminal is disconnected. Referring to FIG. 4, in operation 416, the PCF 405 may transmit an Alarm Report to the UTM 408. The Alarm Report may be transmitted to the UTM 408 via the NEF and AF 407, and may include a location information format used by the UTM such as geographic information or administrative information corresponding to the Cell ID, in addition to the UE ID and Cell ID. The disclosure is not limited to the above example.

The UTM 408 may review the communication status and travel route of the terminal based on the information received from the wireless communication system, and deliver a message for controlling the UAV 401, to the UAV 401 and the UAV controller terminal (UAC) 402. According to circumstances, the UTM 408 delivers, to the UAV 401 and the UAV Controller (UAC) terminal 402 through a wireless communication system, necessary control messages such as commanding the UAV terminal 401 to detour before entering a no flight zone, forcibly landing the UAV terminal 401 or making a turning flight at a certain location, Referring to FIG. 4, in operation 417, the UTM 408 may deliver a UAS Control Override message to the UAV 401 or the UAC 402, and the UAS Control Override message may include an orientation, an authentication code (auth code), control codes, or the like. The disclosure is not limited to the above example.

Accordingly, according to the embodiments of the disclosure, a method and apparatus for allowing, by using a wireless communication system, the UTM 408 to conduct necessary control on the UAS terminals 401, 402 before the UAS terminal (e.g., the UAV 401, UAC 402) moves to a no flight zone. According to the disclosure, when the quality of a communication channel decreases to or below a set value in a situation where a terminal is flying in a location adjacent to a no flight zone, a warning message is sent to the UTM 408 through a wireless communication system to enable the UTM 408 to perform necessary control on the UAS terminals 401 and 402 in a controllable environment with respect to the UAS terminals 401 and 402.

Figure 5:
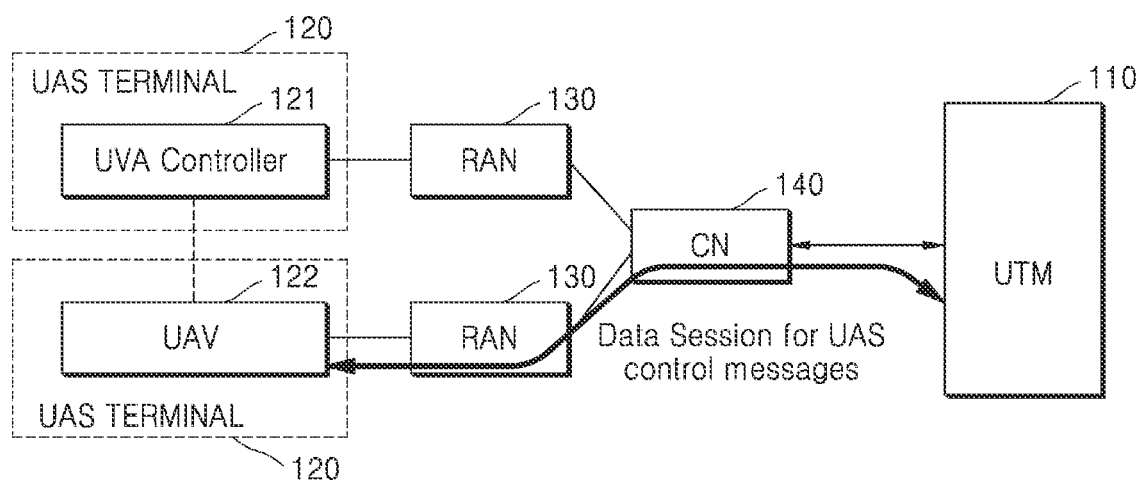
FIG. 5 is a diagram for describing a method of delivering a UAS control message via a data plane of a wireless communication system, according to an embodiment of the disclosure.

FIG. 5 is a diagram for describing a method of delivering an UAS control message via a data plane of a wireless communication system, according to an embodiment of the disclosure.

Referring to FIG. 5, the UTM 110 may deliver a UAS control message of the UTM by utilizing a packet data unit (PDU) session for UAS with respect to the UAS terminal 122 that has moved outside a UAS service-allowed area.

According to an embodiment of the disclosure, a UAS control message may be transmitted or received through the RAN 130 and the CN 140 of the wireless communication system. In detail, a data session between the UAV 122 and the UTM 110 may be established, and the UAV 122 and the UTM 110 may transmit or receive a UAS control message through the established data session.

According to an embodiment of the disclosure, a data session may include a PDU session, and the PDU session may be a dedicated session for transmitting or receiving a UAS control message of the UTM 110.

Also, according to an embodiment of the disclosure, a data session for transmitting or receiving a UAS control message may be established by a PDU Session identifier distinguished from other data sessions. The PDU Session identifier may be a DNN or an S-NSSAI indicating a certain slice, or a separate reserved indicator. Also, a data session for transmitting or receiving a UAS control message may be a data session using a separate port.

Also, according to an embodiment of the disclosure, a data session for transmitting or receiving a UAS control message may be established by a 5G QoS Indicator (5QI) or a reserved QoS Flow Identifier (QFI) that is distinguished from other sessions.

Also, according to an embodiment of the disclosure, a data session for transmitting or receiving a UAS control message may be established in a UE registration procedure for a UAS service.

Additionally, according to an embodiment of the disclosure, a data session for transmitting or receiving a UAS control message may be a data session that is not affected by the control of an allowed service area.

Figure 6:
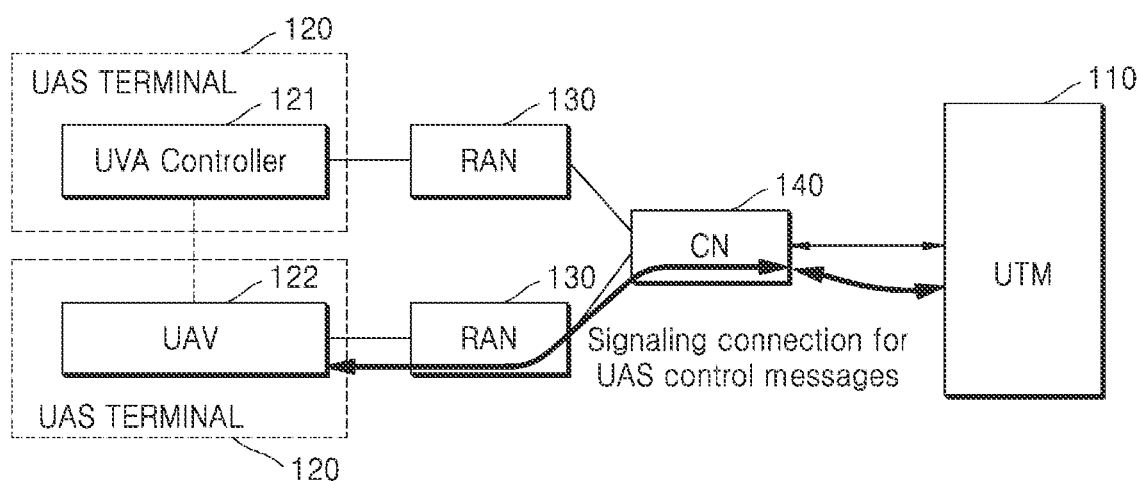
FIG. 6 is a diagram for describing a method of delivering a UAS control message via a control plane of a wireless communication system, according to an embodiment of the disclosure.

FIG. 6 is a diagram for describing a method of delivering an UAS control message via a control plane of a wireless communication system, according to an embodiment of the disclosure.

Referring to FIG. 6, the UTM 110 may deliver control information of the UTM by using a Non-Access Stratum (NAS) message for delivering control information of a wireless communication system, with respect to a UAS terminal that has moved outside a UAS service-allowed area.

According to an embodiment of the disclosure, the UTM 110 may deliver a UAS control message to the UAV 122 by using a Non-Access Stratum (NAS) message for transmitting control information of a wireless communication system. In detail, the UTM 110 may deliver a NAS message including UAS control information, to the CN 140, and the NAS message may be delivered to the UAV 122 via the CN 140 and the RAN 130.

According to an embodiment of the disclosure, a NAS message including UAS control information may be configured in a new format including UAS control information or may be configured in an existing NAS message format. Also, the NAS message may include a container including UAS control information.

Figure 7:
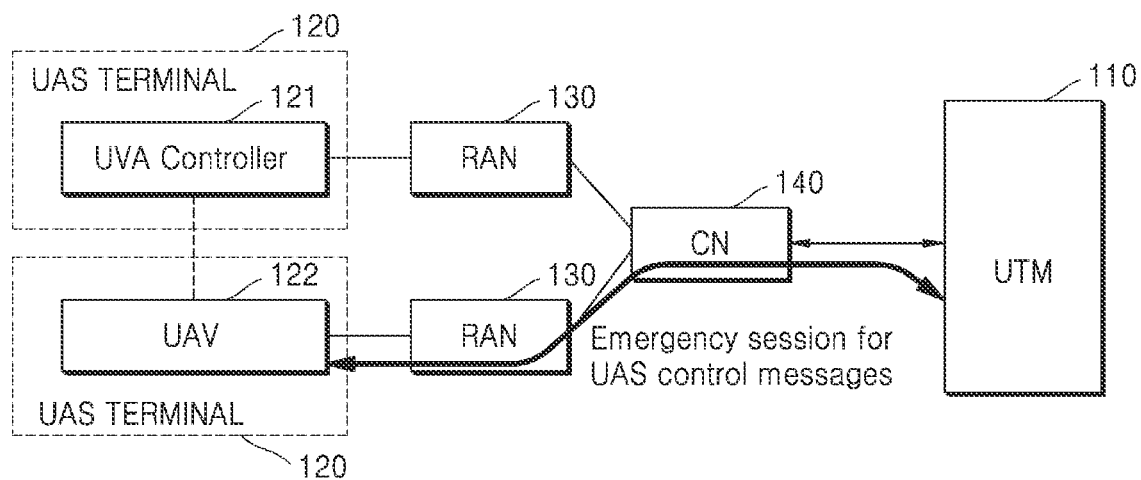
FIG. 7 is a diagram for describing a method of delivering a UAS control message by using an emergency session function of a wireless communication system, according to an embodiment of the disclosure.

FIG. 7 is a diagram for describing a method of delivering an UAS control message by using an emergency session function of a wireless communication system, according to an embodiment of the disclosure.

Referring to FIG. 7, the UTM 110 may deliver a UAS control message of the UTM, with respect to the UAS terminal 122 that has moved outside a UAS service-allowed area, by utilizing an emergency session function of a wireless communication system.

According to an embodiment of the disclosure, the UTM 110 may transmit a paging request for an emergency session, to the CN 140. The UTM 110 may transmit a UAS control message to the UAV 122 through an emergency session. According to this embodiment of the disclosure, a method of enabling, by using a wireless communication system, control through a UTM in a situation in which communication is restricted because a UAS terminal has moved to a no flight zone. Hereinafter, a method of transmitting the UAS control message described with reference to FIGS. 5 and 6 is described in further detail.

Figure 8:
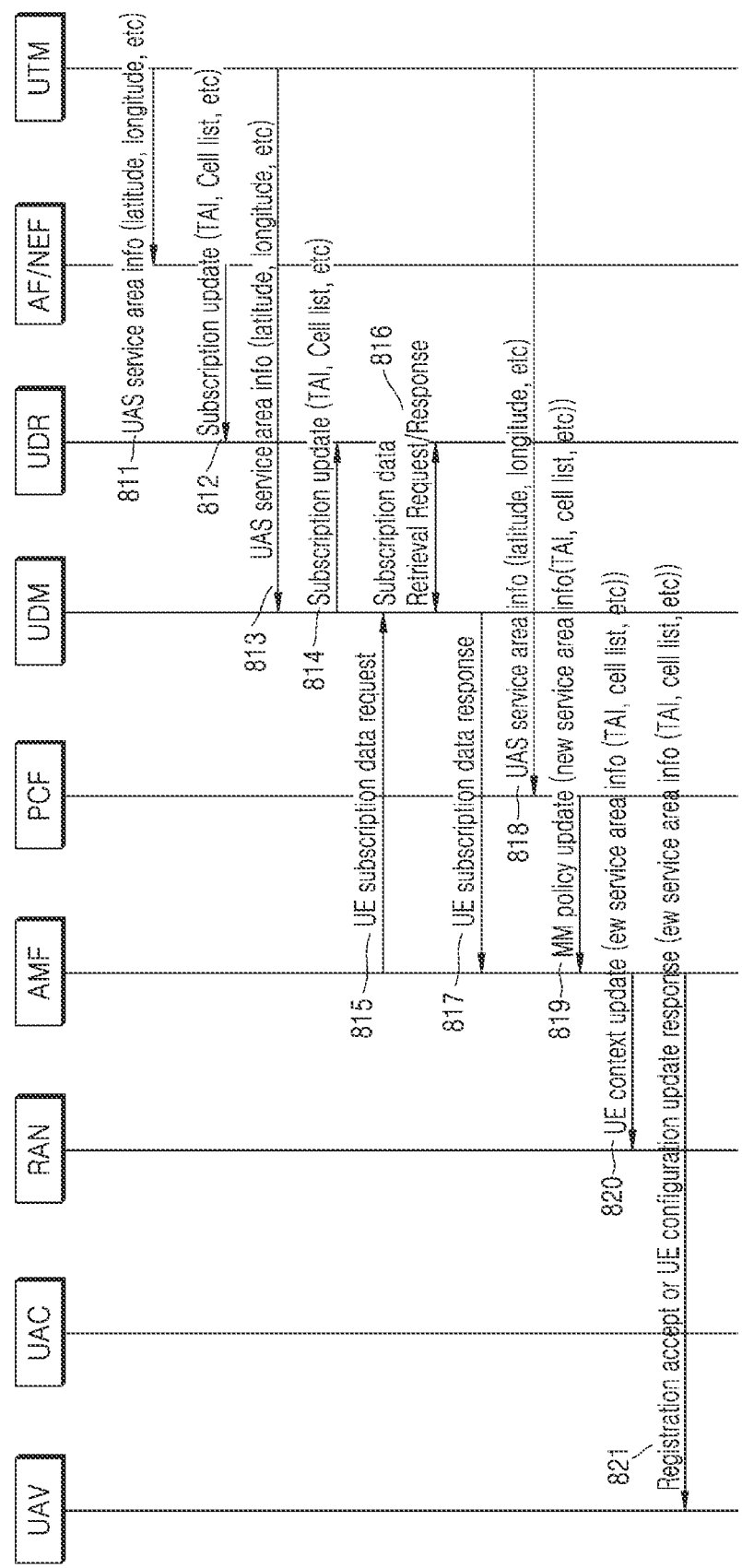
FIG. 8 is a diagram for describing a process of receiving information about a UAS service area from a UTM and delivering information necessary for management of the service area to a base station and a terminal, according to an embodiment of the disclosure.

FIG. 8 is a diagram for describing a process of receiving information about an UAS service area from a UTM, and delivering information necessary for management of a service area to a base station and a terminal, according to an embodiment of the disclosure.

FIG. 8 illustrates a process in which information about a UAS service area is delivered from a UTM to a wireless communication system during initial registration of a terminal or a UTM service initiation process. The wireless communication system calculates information necessary for operation of a network and a terminal, based on UAS service area information provided by the UTM, and deliver the information to each network function and each UAS terminal to enable necessary control.

In operation 811, the UTM may configure UAS service area information including geographic information such as latitude and longitude with respect to each UAS terminal and deliver the UAS service area information to an Application Function (AF)/Network Exposure Function (NEF) of the wireless communication system.

In operation 812, the AF/NEF may convert the UAS service area information into information such as Tracking Area ID and cell ID, which are parameters used in a corresponding wireless communication system, and store the information obtained by the converting, in a Unified Data Repository (UDR) that stores subscriber information of the UAS terminals.

According to an embodiment of the disclosure, when direct communication between a UTM and a User Data Management (UDM) that manages subscriber information is permitted, in operation 813, the UTM may directly transmit the UAS service area information to the UDM, and in operation 814, the UDM may convert the received UAS service area information into location information of a corresponding wireless communication system and store the same in the UDR. That is, among operation 812 and operations 813 and 814, only one of the two may be performed, or both operation 812 and operations 813 and 814 may be performed.

In operation 815, an Access Management Function (AMF) may request subscriber information with respect to the UAS terminals, from the UDM. In operation 816, the UDM may obtain subscriber information from the UDR through a subscriber information search request and response.

In operation 817, the stored UAS service area information may be delivered to the AMF together with other subscriber information for controlling a wireless communication service, and may be utilized as service area information for controlling a communication service of the UAS terminal.

In operation 818, to update UAS service areas, the UTM may deliver updated UAS service area information to a Policy Control Function (PCF).

In operation 819, the PCF may convert the received UAS service area information into a communication service area with respect to a corresponding UAS terminal of the wireless communication system and transmit the same to the AMF through an MM policy update control message.

In operation 820, the AMF may deliver the communication service area information with respect to the UAS terminal, received through the above-described process, to the base station and the terminal through a UE Context Update message and a Registration Accept (or UE configuration update) message, respectively.

In operation 821, the base station may perform, based on the received service area information, an operation of blocking a handover with respect to a PDU session of the terminal when the terminal moves outside the service area. The terminal selects and accesses a base station within an allowed service area based on the received service area information. In spite of the above-described operation of the terminal, due to malfunction of the terminal or reception of inaccurate information, etc. there may be occasions where the terminal moves to an area where UAS services are not allowed, and a method of controlling the operation of the UAS terminal in such a situation is required.

According to an embodiment of the disclosure, names of the messages illustrated in FIG. 8 are merely an embodiment and the messages are not limited to the message names. In addition, only some of the operations illustrated in FIG. 8 may be performed.

Figure 9:
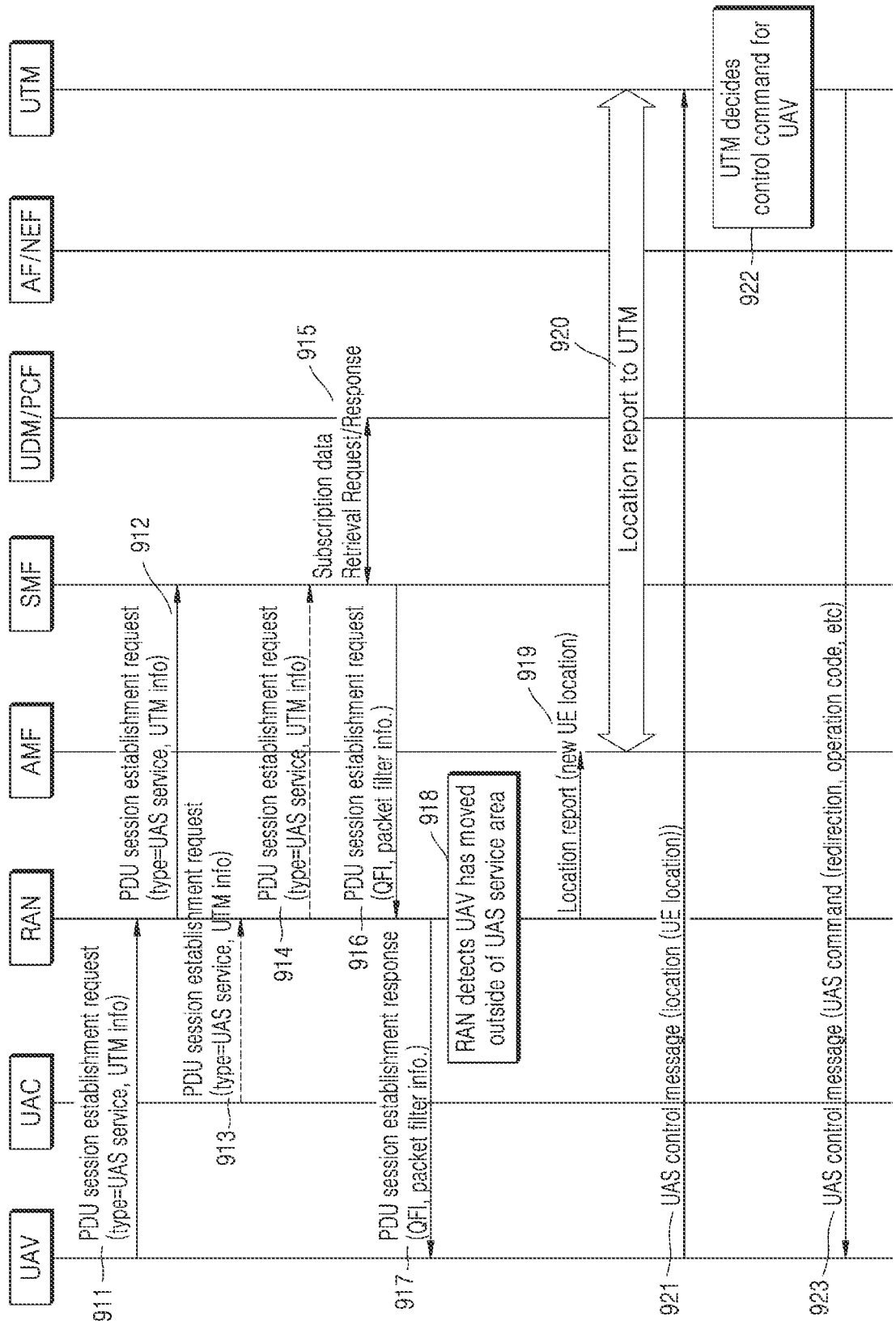
FIG. 9 illustrates a method, performed by a UAS terminal, of establishing a PDU session with respect to a UAS traffic management (UTM) for delivery of a control message and receiving a control message from the UTM outside a designated service area, according to an embodiment of the disclosure.

FIG. 9 illustrates a method, performed by an UAS terminal, of establishing a PDU session for delivery of a control message with respect to a UAS Traffic Management (UTM) for delivery of a control message and receiving a control message from the UTM outside a designated service area, according to an embodiment of the disclosure.

FIG. 9 illustrates a detailed process of the method of delivering a control message of a UTM by using a PDU session, described with reference to FIG. 6.

In operations 911 to 914, in a process of initiating UAS services with a UTM after connection to a wireless communication system is completed, each UAS terminal (UAV terminal or UAV controller terminal) may perform a procedure of establishing a separate PDU session to be used for transmitting or receiving UAS control messages to or from the UTM. That is, the UAV terminal and the UAV controller terminal may each transmit a PDU session establishment request to the base station, and the base station may transmit a PDU session establishment request to an SMF.

According to an embodiment of the disclosure, a PDU session establishment request message transmitted by the terminal to establish a PDU session to be used for transmitting or receiving of a UAS control message includes a type=UAS service value, which is designated to indicate that the message is set for transmission of a UAS control message, and may additionally include information of a UTM to be accessed.

According to an embodiment of the disclosure, the information of a UTM is information for designating a UTM server, and may include at least one of information such as an IP address, a TCP/UDP port, and a protocol type of the UTM server. A PDU session establishment process may be performed identically for each of the UAV and UAV controller terminal, and in FIG. 9, for convenience of description, description will focus on the operation of the UAV terminal.

Upon receiving a PDU session establishment request message set as type=UAS service, from the UAS terminal in operation 915, the SMF may determine whether to accept the PDU session request for a UAS service, based on subscriber information of the UAS terminal, the subscriber information being received from a UDM (or PCF).

In operations 916 to 917, the SMF may deliver, to the terminal, a result of determining whether to accept the PDU session request for a UAS service, through a PDU session establishment response message. That is, the SMF may transmit a PDU session establishment response message to the base station, and the base station may transmit a PDU session establishment response message to the terminal.

According to an embodiment of the disclosure, the subscriber information may include information on a UTM allowed for the UAS terminal to use a UAS service, and may be used as a criterion for determining whether to allow UTM information received from the terminal. In addition, the PDU session establishment response message may include at least one of a QoS Flow ID and packet filter information to be used by the UAS terminal to transmit and receive UAS control messages to or from the UTM.

According to an embodiment of the disclosure, packet filter information is information for limiting packets that may be transmitted or received using a QoS Flow ID, and includes at least one piece of information from among a source IP address, a source port, a destination IP address, a destination port, and a protocol type, and is used to limit a QoS Flow to the purpose of transmission and reception of UAS control messages. That is, the destination IP address and the destination port are respectively set to an IP address and a port of the UTM server designated in the subscriber information received by the SMF (or preset in the SMF). The SMF may set a QFI value designated for a UAS service, in the PDU session establishment response message or include a separate indicator such as type=UAS service, in the PDU session establishment response message, and transmit the message to the base station and the terminal so as to maintain the corresponding PDU session and QoS Flow and thus enable transmission and reception of a UAS control message even when the base station and the terminal move outside a designated communication service area.

When the terminal moves outside a service area with respect to the UAS terminal in a situation where the service area for the UAS terminal is defined and managed through the process described with reference to FIG. 8, in operation 918, the base station may detect that the terminal has moved outside the service area, based on the received service area information, and in operations 919 to 920, the base station may report, to the UTM through the AMF, that the terminal has moved outside the service area.

Apart from the above, in operation 921, the UAS terminal may perform an operation of reporting a location of the terminal to the UTM via a UAS control message.

In operation 922, the UTM may detect, from the location information of the UAS terminal, the location information being received from the UAS terminal or the wireless communication system, that the terminal has moved outside the UAS service allowed area, and determine a previously designated command required for control of the UAS terminal (e.g., return to the allowed area, landing, etc.).

In operation 923, the UTM transmits the UAS control message to the wireless communication system, and the wireless communication system delivers the UAS control message to the UAS terminal through the PDU session and QoS Flow that are maintained for the purpose of UAS transmission. Upon receiving the UAS control message, the UAS terminal may perform a necessary operation according to a command designated by the UTM.

According to an embodiment of the disclosure, the UTM may transmit information about no flight zones of the UAS terminal, to the CN of the wireless communication system. The CN may configure UAS service restricted area information (e.g., information about a UAS service area) in a mobile communication system based on the information about no flight zones, received from the UTM, and deliver the UAS service restricted area information to the RAN.

According to an embodiment of the disclosure, the UAS service restricted area information may be a tracking area identifier (TAI) or a cell ID. The UAS service restricted area information is not limited to the above example, and the UAS service restricted area information may include any type of information that can identify a UAS service restricted area.

That is, the CN may identify which cell or which tracking area a no flight zone corresponds to, generate (or configure) UAS service restricted area information which is the identified information, and provide the UAS service restricted area information to the RAN.

According to an embodiment of the disclosure, in a process of determining whether handover occurs, based on channel quality information included in a Measurement Report received from the terminal, the RAN may perform an operation of selecting a target cell for handover, in consideration of a current cell ID, GPS location information, UAS service restricted area information, and the like of the terminal.

Figure 10:
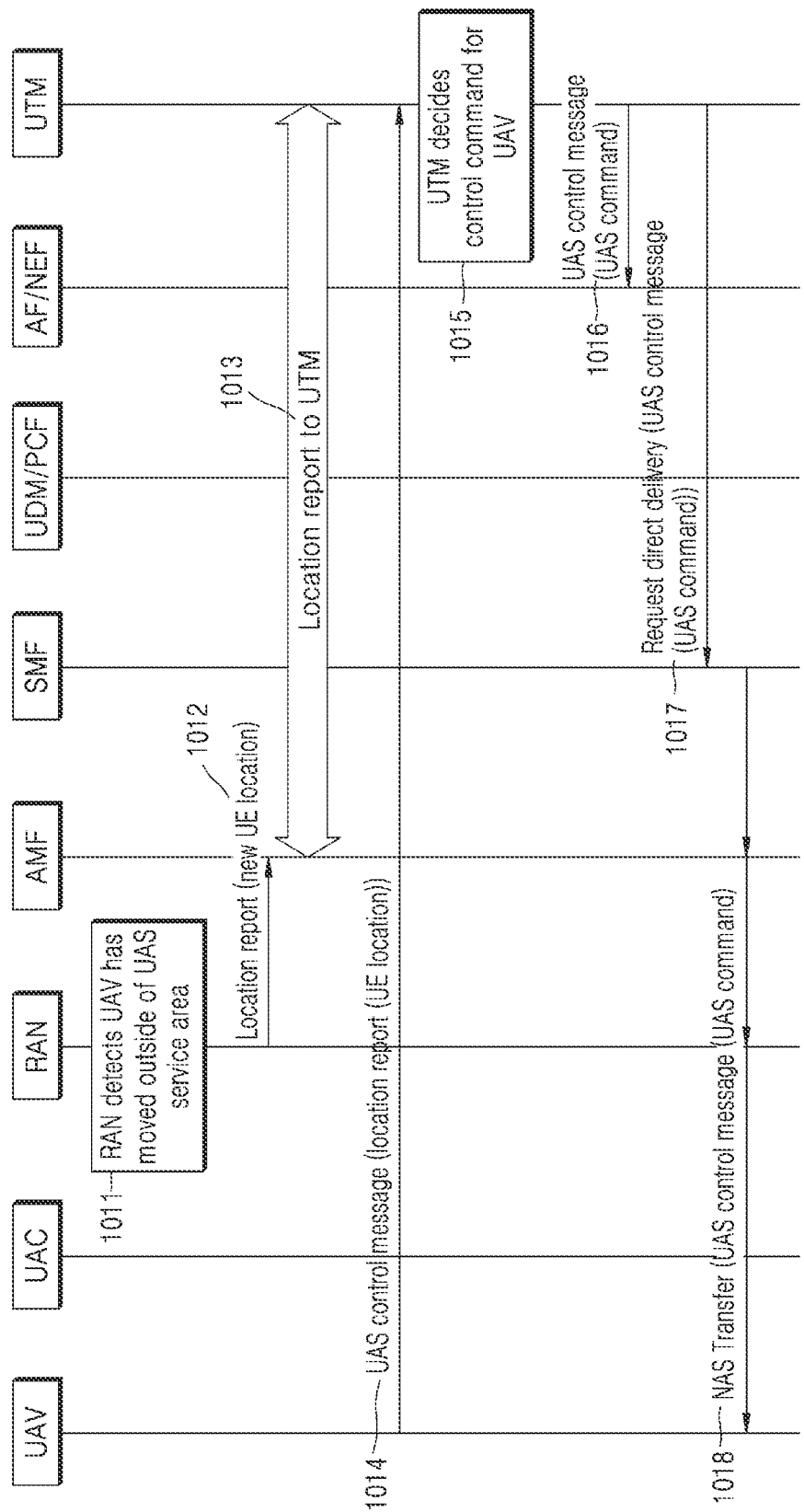
FIG. 10 illustrates a method, performed by UTM, of delivering a UAS control message to a UAS terminal by using a control message of a wireless communication system, according to an embodiment of the disclosure.

FIG. 10 illustrates a method, performed by a UTM, of delivering a UAS control message to a UAS terminal by using a control message of a wireless communication system, according to an embodiment of the disclosure.

FIG. 10 illustrates a process of transmitting a UAS control message by using a control plane message of the wireless communication system described above in FIG. 7, that is, a NAS message, according to an embodiment of the disclosure. The case of FIG. 10 may be a case where a separate PDU session and QoS flow are not be previously set for the UAS service described with reference to FIG. 9, and a NAS message of a wireless communication system is used to deliver a UAS control message from a UTM to a UAS terminal.

As described with reference to FIG. 9, in operation 1011, a base station may detect a UAS terminal that has moved outside a UAS service area, and in operations 1012 to 1013, the base station may report location information of the UAS terminal to the UTM.

Apart from the above, in operation 1014, the UAS terminal may perform an operation of reporting a location of the terminal to the UTM through a UAS control message.

In operation 1015, the UTM detects, from the received information, that the UAS terminal has left an allowed service area. The UTM may determine a control command required to control the UAS terminal.

In operation 1016, the UTM transmits a UAS control message to an AF (or NEF) of the wireless communication system to request delivery of the UAS control message (UAS command) to the UAS terminal.

In operation 1017, the AF and NEF may transmit, to an SMF, a direct delivery request message including the UAS control message, for transmission of the received UAS control message. In this case, the AF may transmit the direct delivery request message by including therein indicator information indicating that the request is for transmission of a UAS control message.

In operation 1018, the SMF may configure a NAS Transfer control message including the UAS control message and transmit the NAS Transfer control message to the UAS terminal by using a port (or a separate indicator) designated for a UAS service. The terminal receiving the NAS Transfer control message may confirm that the received NAS Transfer message is for the purpose of delivering the UAS control message, based on a port (or a separate indicator) previously designated for a UAS service, the port being included in the message. The terminal may extract the UAS control message and deliver the same to a UAS application client of the terminal. The terminal may interpret the received UAS control message to perform an operation designated by the UTM.

Figure 11:
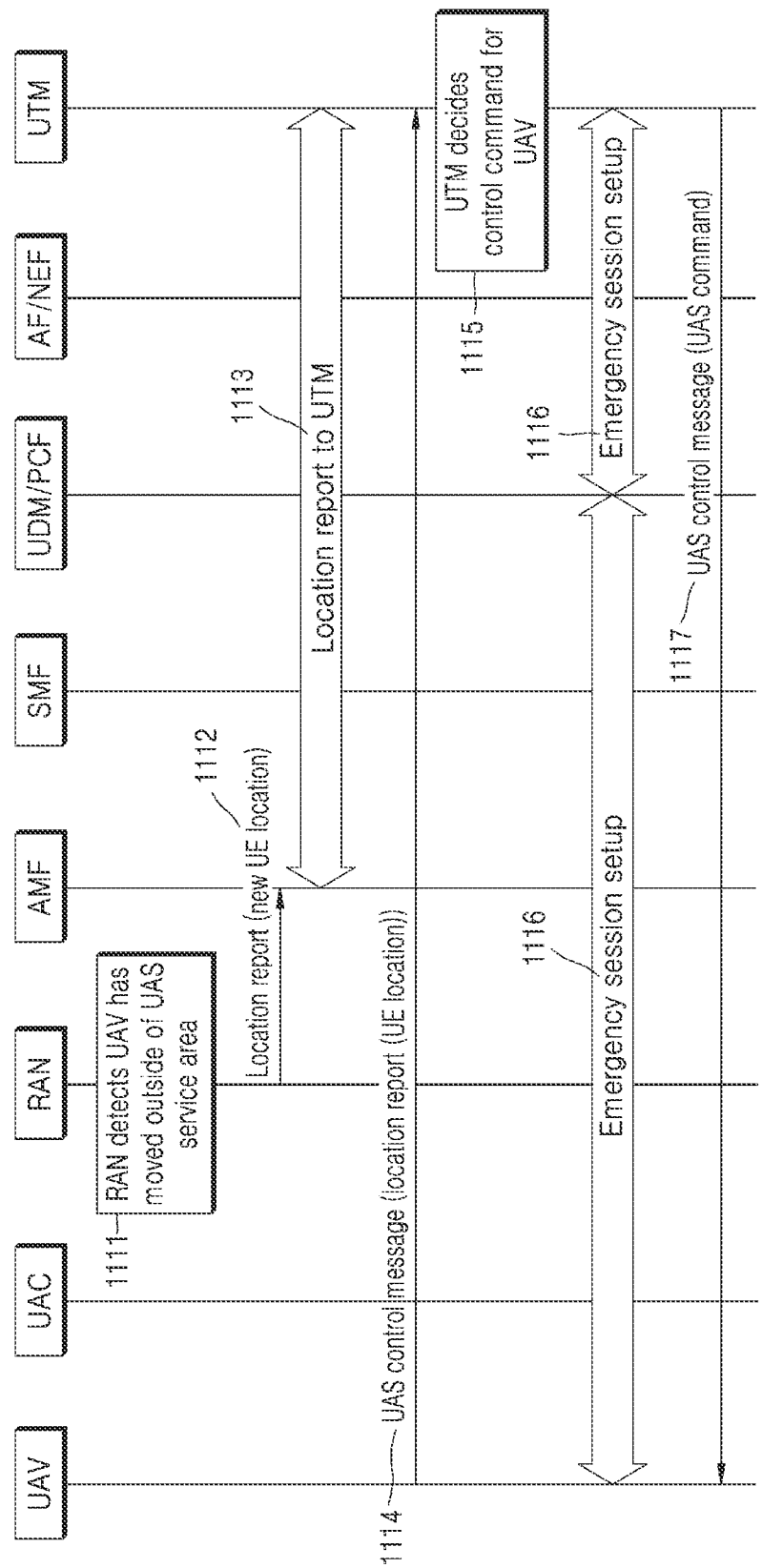
FIG. 11 illustrates a method, performed by a UTM, of delivering a UAS control message by using an emergency session function of a wireless communication system, according to an embodiment of the disclosure.

FIG. 11 illustrates a method, performed by a UTM, of delivering an UAS control message by using an emergency session function of a wireless communication system, according to an embodiment of the disclosure.

FIG. 11 is a diagram illustrating a process of delivering a UAS control message to a UAS terminal that has left a UAS service allowed area, by using an emergency session function of the wireless communication system described above with reference to FIG. 8, according to an embodiment of the disclosure.

As described with reference to FIGS. 9 and 10, in operations 1111 to 1115, the UTM may determine that the UAS terminal has left the UAS service area, based on the location information of the terminal, received from the RAN, and may determine a necessary control command. The above corresponds to the description provided with reference to FIGS. 9 and 10, and thus, a detailed description thereof is omitted here.

In operation 1116, the UTM may deliver a message requesting an emergency session setup (Emergency Session Setup) to the wireless communication system, in order to deliver the control command. The message requesting an emergency session setup may include an indicator indicating that the emergency session setup request is with respect to a UAS service, and UTM information. According to an embodiment of the disclosure, the UTM information may include at least one of a source IP, a source port, a destination IP, a destination port, and protocol type information that are to be used for delivery of a UAS message. The PCF of the wireless communication system may identify a UTM based on the subscriber information of the UAS terminal, and determine whether to accept an emergency session request received from the UTM, and may proceed with a procedure necessary for an emergency session setup when it is determined to allow the emergency session request. The PCF may respond to the UTM that the emergency session setup is complete, and the UTM that has received the response may transmit a UAS control message to the terminal through a PDU session for the set emergency session. Upon receiving the UAS control message, the UAS terminal may perform a necessary operation according to a control command designated by the UTM.

Figure 12:
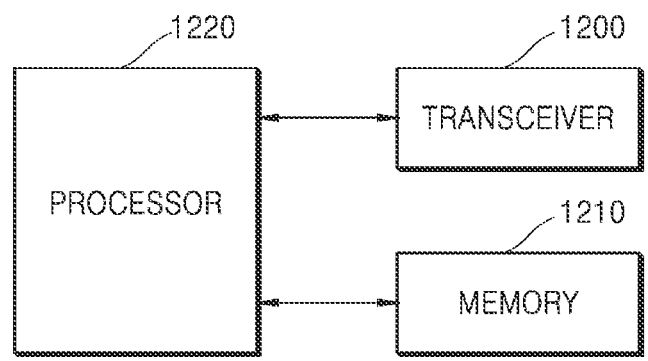
FIG. 12 discloses a configuration of a terminal according to an embodiment of the disclosure.

FIG. 12 illustrates a configuration of a terminal according to an embodiment of the disclosure.

As illustrated in FIG. 12, the terminal according to the disclosure may include a processor 1220, a transceiver 1200, and a memory 1210. However, the components of the terminal are not limited to the above-described examples. For example, the terminal may include more or fewer components than the above-described components. In addition, the processor 1220, the transceiver 1200, and the memory 1210 may be implemented in the form of a single chip. Also, according to an embodiment of the disclosure, the terminal may include the above-described UAS terminal (UAV terminal, UAV controller terminal).

According to an embodiment of the disclosure, the processor 1220 may control a series of processes in which the terminal may operate according to the above-described embodiments of the disclosure. For example, the processor 1220 may control components of the terminal such that the UAV terminal and the UAV controller terminal are controlled according to the above-described embodiments. The processor 1220 may execute a program stored in the memory 1210 to control components of the terminal and execute the embodiments of the disclosure described above. Also, the processor 1220 may be an application processor (AP), a communicator processor (CP), a circuit, an application-specific circuit, or at least one processor.

According to an embodiment of the disclosure, the transceiver 1200 may transmit or receive a signal to or from other network entities or other terminals. The signal transmitted or received to or from the network entities or the other terminals may include control information and data. The transceiver 1200 may include an RF transmitter up-converting and amplifying a frequency of a transmitted signal and an RF receiver performing low noise amplification on a received signal and down-converting a frequency of the received signal. However, the transceiver 1200 is merely an example, and the components of the transceiver 1200 are not limited to the RF transmitter and the RF receiver. In addition, the transceiver 1200 may receive a signal via a radio channel and output the signal to the processor 1220, and transmit the signal output from the processor 1220, via a radio channel.

According to an embodiment of the disclosure, the memory 1210 may store programs and data needed for an operation of a terminal. In addition, the memory 1210 may store control information or data included in a signal transmitted or received by a terminal. The memory 1210 may be configured in a storage medium, such as ROM, RAM, a hard disk, CD-ROM, or DVD, or a combination thereof. Also, the memory 1210 may be included in a plural number. In addition, according to an embodiment of the disclosure, the memory 1210 may store a program for performing operations of the embodiments for providing the UAS service described above.

Figure 13:
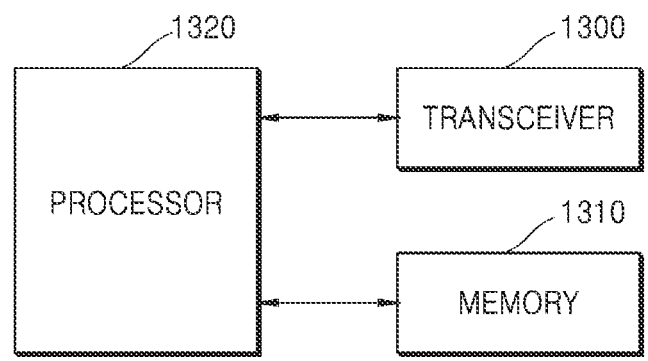
FIG. 13 discloses a configuration of a network entity according to an embodiment of the disclosure.

FIG. 13 illustrates a configuration of a Network Function (NF) according to an embodiment of the disclosure.

As illustrated in FIG. 13, the terminal according to the disclosure may include a processor 1320, a transceiver 1300, and a memory 1313. However, the components of the NF are not limited to the above-described example. For example, the NF may include more or fewer components than the above-described components. In addition, the processor 1320, the transceiver 1300, and the memory 1310 may be implemented in the form of a single chip. Also, according to an embodiment of the disclosure, the NF may refer to a network entity (network function), and the network entity may include a RAN, an AMF, an SMF, a PCF, a UDM, a UDR, an AF, an NEF and a UTM.

According to an embodiment of the disclosure, the processor 1320 may control a series of processes in which the NF may operate according to the above-described embodiment of the disclosure. For example, the processor 1320 may control the components of the NF to provide a UAS service according to the above-described embodiments of the disclosure. The processor 1320 may execute a program stored in the memory 1310 to thereby control components of the terminal and execute the embodiments of the disclosure described above. Also, the processor 1320 may be an application processor (AP), a communicator processor (CP), a circuit, an application-specific circuit, or at least one processor.

According to an embodiment of the disclosure, the transceiver 1300 may transmit or receive a signal to or from other network entities or other terminals. The signal transmitted or received to or from the other network entities or terminals may include control information and data. The transceiver 130 may include an RF transmitter up-converting and amplifying a frequency of a transmitted signal and an RE receiver performing low noise amplification on a received signal and down-converting a frequency of the received signal. However, the transceiver 1300 is merely an embodiment, and the components of the transceiver 1300 are not limited to the RF transmitter and the RE receiver. In addition, the transceiver 1300 may receive a signal via a radio channel and output the signal to the processor 1320, and transmit the signal output from the processor 1320, via a radio channel.

According to an embodiment of the disclosure, the memory 1310 may store programs and data needed for an operation of an NF. In addition, the memory 1310 may store control information or data included in a signal transmitted or received by an NF. The memory 1310 may be configured in a storage medium, such as ROM, RAM, a hard disk, CD-ROM, or DVD, or a combination thereof. Also, the memory 1310 may be included in a plural number. In addition, according to an embodiment of the disclosure, the memory 1310 may store a program for performing operations of the embodiments for providing a UAS service described above.

The methods according to the embodiments described in the claims or specification of the disclosure may be implemented in the form of hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions causing the electronic device to execute the methods according to embodiments as described in the claims or the specification of the disclosure.

The programs (e.g., software modules or software) may be stored in RAM, a non-volatile memory including a flash memory, ROM, an electrically erasable programmable read-only memory (EEPROM), a magnetic disc storage device, CD-ROM, DVD, or other types of optical storage device, or a magnetic cassette. Alternatively, the programs may be stored in a memory including a combination of some or all of the above-described memories. In addition, each constituent memory may be included by a plural number.

The programs may also be stored in an attachable storage device which is accessible through a communication network configured with the Internet, an intranet, a local area network (LAN), a wide LAN (WLAN), or a storage area network (SAN), or a combination thereof. The storage device may be connected to an apparatus performing the embodiments of the disclosure through an external port. Another storage device on a communication network may also be connected to the apparatus performing the embodiments of the disclosure.

In the above-described embodiments of the disclosure, components included in the disclosure are expressed in a singular or plural form according to the embodiments of the disclosure. However, the singular or plural form is appropriately selected for convenience of explanation, and the disclosure is not limited thereto. As such, an element expressed in a plural form may also be configured as a single element, and an element expressed in a singular form may also be configured as plural elements.

Meanwhile, the embodiments of the disclosure disclosed in the present specification and the drawings are merely examples to provide an easy description of the technical content of the disclosure and help understanding of the disclosure, and are not intended to limit the scope of the disclosure. In other words, it is obvious to those skilled in the art that other modifications based on the technical spirit of the disclosure can be implemented. Also, the embodiments of the disclosure may be combined with each other as required and operated. For example, a base station and a terminal may be operated by combining parts of an embodiment of the disclosure with parts of another embodiment of the disclosure. Also, the embodiments of the disclosure are applicable to other communication systems, and other modification examples based on the technical idea of the embodiments of the disclosure may also be made.

The invention claimed is:

1. A method, performed by an access and mobility management function (AMF), of providing an unmanned aerial system (UAS) service, the method comprising:
performing an authorization procedure with respect to an unmanned aerial vehicle (UAV) and a UAV controller (UAC);
after the authorization procedure is completed, receiving UAS serviceable area information from a unified data management (UDM) or a policy control function (PCF), wherein the UAS serviceable area information is determined based on a no flight zone determined by an unmanned traffic management (UTM);
providing the received UAS serviceable area information to the UAV and the UAC via a base station
transmitting, to the UTM, a location report that the UAV has left the UAS serviceable area received from the base station; and
transmitting, to the UAV, a UAS control message for controlling the UAV according to a control command designated by the UTM received from the UTM through an emergency session between the UAV and the UTM.

2. The method of claim 1, wherein the providing of the received UAS serviceable area information to the UAV and the UAC via a base station comprises providing the received UAS serviceable area information via a registration approval message, and
the receiving of the UAS serviceable area information from the UDM or the PCF comprises receiving the UAS serviceable area information via a response message to a registration request message transmitted to the UDM or the PCF.

3. The method of claim 1, wherein the UAS serviceable area information comprises at least one of a tracking area identifier (TAI) or a cell identifier (ID).

4. The method of claim 1, further comprising:
receiving, from the base station, notification information notifying that a connection with the UAV is disconnected or that the UAV may enter the no flight zone; and
transmitting, to a UAS terminal, a UAS control message generated based on the notification information to control the UAV received from the UTM.

5. The method of claim 4, wherein the notification information comprises at least one of identification information of the UAV and UAC, cell ID information, geographical location information, or administrative location information of the UAV.

6. The method of claim 4, wherein the UAS control message includes at least one of direction information, authentication code information, or control code information.

7. A method of providing an unmanned aerial system (UAS) service of an unmanned aerial vehicle (UAV), the method comprising:
transmitting, to an access and mobility management function (AMF), a registration request message through a base station;
performing an authorization procedure with respect to a network entity in a core network, based on the registration request message;
after the authorization procedure is completed, receiving UAS serviceable area information, determined based on a no flight zone, from a policy control function (PCF) or a unified data management (UDM), via the base station;
in a case that the UAV has left the UAS serviceable area, setting an emergency session with an unmanned traffic management (UTM); and
receiving, from the UTM a UAS control message for controlling the UAV according to a control command designated by the UTM through the emergency session.

8. The method of claim 7, wherein the receiving of the UAS serviceable area information from the base station comprises receiving the UAS serviceable area information through a registration approval message,
wherein the UAS serviceable area information comprises at least one of a tracking area identifier (TAI) or a cell identifier (ID).

9. The method of claim 7, further comprising:
transmitting a measurement report to the base station; and
receiving a UAS control message from the UTM,
wherein the UAS control message is received in a case that a connection with the UAV is disconnected or that the UAV may enter the no flight zone.

10. The method of claim 9, wherein the notification information comprises at least one of identification information of the UAV and UAC, cell ID information, geographical location information, or administrative location information of the UAV, and
the UAS control message comprises at least one of direction information, authentication code information, or control code information.

11. An access and mobility management function (AMF) for providing an unmanned aerial system (UAS) service, the AMF comprising:
a transceiver; and
a processor coupled to the transceiver and configured to:
perform an authorization procedure with respect to an unmanned aerial vehicle (UAV) and a UAV controller (UAC),
receive, after the authorization procedure is completed, UAS serviceable information from an unified data management (UDM) or a policy control function (PCF), wherein the UAS serviceable area information is determined based on a no flight zone determined by an unmanned traffic management (UTM), and
provide, to the UAV and the UAC, the received serviceable information, through a base station, transmit, to the UTM, a location report that the UAV has left the UAS serviceable area received from the base station, and transmit, to the UAV, a UAS control message for controlling the UAV according to a control command designated by the UTM received from the UTM through an emergency session between the UAV and the UTM.

12. The AMF of claim 11, wherein the processor is further configured to provide the received UAS serviceable area information via a registration approval message, and receive the UAS serviceable area information via a response message to a registration request message transmitted to the UDM or the PCF.

13. The AMF of claim 11, wherein the UAS serviceable area information comprises at least one of a tracking area identifier (TAI) or a cell identifier (ID).

14. The AMF of claim 11, wherein the processor is further configured to:

receive, from the base station, notification information notifying that a connection with the UAV is disconnected or that the UAV may enter the no flight zone, transmit the received notification information to the PCF, and transmit, to a UAS terminal, a UAS control message generated based on the notification information to control the UAV received from the UTM.

15. An unmanned aerial vehicle (UAV) for providing an unmanned aerial system (UAS) service, the UAV comprising:

a transceiver; and a processor coupled to the transceiver and configured to:

transmit to an access and mobility management function (AMF) a registration request message via a base station, perform an authorization procedure with respect to a network entity in a core network based on the registration request message, after the authorization procedure is completed, receive UAS serviceable area information, determined based on a no flight zone, from a policy control function (PCF) or a unified data management (UDM), via the base station, in a case that the UAV has left the UAS serviceable area, set an emergency session with an unmanned traffic management (UTM), and receive, from the UTM a UAS control message for controlling the UAV according to a control command designated by the UTM through the emergency session.

* * * * *